United States Patent
Canter

(10) Patent No.: US 10,025,728 B2
(45) Date of Patent: Jul. 17, 2018

(54) FLASH MEMORY DEVICE FOR STORING SENSITIVE INFORMATION AND OTHER DATA

(71) Applicant: BAE Systems Information and Electronic Systems Integration Inc., Nashua, NH (US)

(72) Inventor: Jeffrey B. Canter, West Orange, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 123 days.

(21) Appl. No.: 15/022,221

(22) PCT Filed: May 19, 2015

(86) PCT No.: PCT/US2015/031586
§ 371 (c)(1),
(2) Date: Mar. 16, 2016

(87) PCT Pub. No.: WO2016/010625
PCT Pub. Date: Jan. 21, 2016

(65) Prior Publication Data
US 2016/0232109 A1  Aug. 11, 2016

Related U.S. Application Data
(60) Provisional application No. 62/025,052, filed on Jul. 16, 2014.

(51) Int. Cl.
| G06F 12/14 | (2006.01) |
| G06F 21/79 | (2013.01) |
| G06F 3/06 | (2006.01) |

(52) U.S. Cl.
CPC ........ *G06F 12/1408* (2013.01); *G06F 3/0623* (2013.01); *G06F 3/0643* (2013.01);
(Continued)

(58) Field of Classification Search
CPC .................................................. G06F 12/1408
(Continued)

(56) References Cited

U.S. PATENT DOCUMENTS

| 2003/0046238 A1* | 3/2003 | Nonaka ................... G06F 21/10 705/51 |
| 2004/0066274 A1 | 4/2004 | Bailey |

(Continued)

FOREIGN PATENT DOCUMENTS

| EP | 1056015 A1 | 11/2000 |
| JP | 2004-152123 A | 5/2004 |

(Continued)

OTHER PUBLICATIONS

PCT/US15/031586, ISR dated Aug. 20, 2015.
(Continued)

*Primary Examiner* — Jacob Lipman
(74) *Attorney, Agent, or Firm* — Leo Zucker; Scott J. Asmus

(57) ABSTRACT

A flash memory process and device for encrypting and storing data in a non-volatile flash memory associated with a host system. The device includes a flash memory, an encryption engine, a key store, a SRAM to interface with the host system, and associated control circuitry. When powered on, the device first determines if a valid encryption key is held in the key store. If a valid key is held in the store, a program flag is set when encrypted data in the flash memory is ready to be decrypted by the engine and stored in the SRAM for use by the host system, or when data originating from the host system and stored in the SRAM is ready to be (Continued)

encrypted by the engine and programmed into the flash memory. The device can be embedded in any host system wherein data must be encrypted while at rest in a memory.

17 Claims, 2 Drawing Sheets

(52) U.S. Cl.
CPC ............ G06F 3/0679 (2013.01); G06F 21/79 (2013.01); *G06F 2212/1052* (2013.01)

(58) Field of Classification Search
USPC ........................................................ 713/193
See application file for complete search history.

(56) References Cited

U.S. PATENT DOCUMENTS

| | | | |
|---|---|---|---|
| 2004/0088554 A1 | 5/2004 | Kawaguchi | |
| 2007/0198856 A1* | 8/2007 | Lee ........................ | G06F 21/79 713/190 |
| 2008/0063183 A1 | 3/2008 | Greco et al. | |
| 2012/0005488 A1 | 1/2012 | Yoon et al. | |
| 2013/0219189 A1 | 8/2013 | Simmons | |
| 2014/0047246 A1 | 2/2014 | Seol et al. | |

FOREIGN PATENT DOCUMENTS

| | | |
|---|---|---|
| JP | 2008-310950 A | 12/2008 |
| JP | 2010-238216 A | 10/2010 |

OTHER PUBLICATIONS

NIST, Advanced Encryption Standard (AES), Federal Information Processing Standards Publication 197, Nov. 26, 2001. Springfield, VA.
DOD, Protection of Mission Critical Functions to Achieve Trusted Systems and Networks (TSN), Nov. 5, 2012. No. 5200.44.
Motorola, Security Policy: Key Management Facility Crypto Card (KMF CC), Version 2.0, Feb. 11, 2002.
SECURRE-Stor(tm) SATA Encrypted Solid State Drives, http://www.microsemi.com/products/solid-state-drives/securre-stor, May 5, 2015.
TRRUST-STOR(tm) Solid State Drive, http://www.microsemi.com/products/solid-state-drives/trrust-stor-ssd, May 5, 2015.
Embedded Flash, http://www.microsemi.com/products/memory/embedded-flash, May 5, 2015.
Morris Dworkin, NIST, Recommendation for Block Cipher Modes of Operation, Methods and Techniques. NIST Special Publication 800-38A, 2001 Edition. Computer Security Division. Dec. 2001.
Elaine Barker and John Kelsey, NIST, Recommendation for Random Number Generation Using Deterministic Random Bit Generators, Computer Security Division, Information Technology Laboratory. NIST SP 800-90A. Jan. 2012.
European Search Report, EP 15821592.1, dated Jan. 16, 2018, 9 pages.
Translation of Office Action, 1 page, dated Feb. 28, 2018.

\* cited by examiner

FLASH MEMORY DEVICE FOR STORING SENSITIVE INFORMATION AND OTHER DATA

CLAIM OF PRIORITY

This application claims the priority of U.S. Provisional Patent Application No. 62/025,052 filed Jul. 16, 2014, titled Self-encrypting Flash Memory, the contents of which are incorporated herein by reference.

BACKGROUND OF THE INVENTION

Field of the Invention

The present invention relates generally to flash memories, and particularly to a flash memory device for storing critical or sensitive technical information and other data.

Discussion of the Known Art

Flash memories were developed from electronically erasable programmable read only memories (EEPROMs), and are used typically for storing programs and other non-volatile data for access and use by processors in the systems in which they reside. Flash memories may be of either a NAND or a NOR type, depending on the internal characteristics of the individual memory cells embedded in the memory. All or selected blocks of data stored in a flash memory can be electronically erased and reprogrammed. See, http://en.wikipedia.org/wiki/Flash_memory, and references cited therein.

If data to be stored in a flash memory is proprietary or sensitive, the data may need to be encrypted while at rest in the memory. For example, to comply with current anti-tamper (AT) requirements imposed by the United States Department of Defense (DoD) in DFARS 252.204-7012 (Nov. 18, 2013), contractors need to provide adequate security to safeguard unclassified controlled technical information (CTI) from being compromised. CTI is defined in the cited document as technical information with military or space application that is subject to controls on access, use, reproduction, modification, performance, display, release, disclosure, or dissemination of the information. See also DoD Instruction No. 5200.44 (Nov. 5, 2012).

Other proprietary applications may also require critical or sensitive software and data to be encrypted before the data is stored in a memory of a host system. In order to encrypt such software or data for storage in the memory, an outside cryptographic engine and associated processor must be added to the system. That is, hardware and software external to that originally embedded in the system are required for the encryption. These additional components, which may be contained in multiple enclosures, would need to be imposed between the flash memory and the host system processor that accesses the memory, thus complicating and slowing the overall encryption process.

Self-encrypting solid state disk drives are commercially available, for example, from Microsemi Corporation, Aliso Viejo, Calif., US. These devices are not part of an embedded system, however, and they require additional busses (e.g. SATA or USB) and software drivers to operate. As far as is known, however, flash memories that can be part of an embedded system and feature a self-encrypting function without special busses or drivers, have not been previously offered or disclosed.

Accordingly, there is a need for an embeddable flash memory device configured so that information or data stored in the memory is kept in an encrypted form while at rest in the memory, without the need for an external cryptographic engine and additional hardware and software.

SUMMARY OF THE INVENTION

According to the invention, a method of encrypting sensitive program or other data for storage in a flash memory associated with a host system, wherein the host system writes data to and reads data from the memory, includes providing a flash memory device including a flash memory, an encryption engine for encrypting data originating from the host system and writing the encrypted data to the memory, and for decrypting data stored in the memory for access by the host system, a static random access memory (SRAM) for supplying the data from the host system to the engine and for receiving the decrypted data from the engine for access by the host system, and a key store for holding an encryption key supplied by either a user or the encryption engine. When powered on, the device first determines if a valid encryption key is held in the key store. If so, and if a program flag is set, then encrypted data in the flash memory is decrypted by the engine and stored in the SRAM for access by the host system, and data originating from the host system and stored in the SRAM is encrypted by the engine and stored in the flash memory.

According to another aspect of the invention, a flash memory device for storing sensitive information or data includes a flash memory, an encryption engine for encrypting data originating from a host system and storing the encrypted data in the flash memory, and for decrypting encrypted data stored in the memory, and an associated random number generator for creating an encryption key when desired. A key store holds an encryption key that is either created by the encryption engine or entered in the key store by a user. A static random access memory (SRAM) supplies the data originating from the host system to the encryption engine, and receives decrypted data from the engine for access by the host system. Control circuitry of the device is configured first to determine if a valid key is held in the key store. If so, the circuitry then determines if a program flag has been set to indicate either that encrypted data in the flash memory is ready for decryption by the encryption engine, or that the flash memory is ready to be programmed with encrypted data from the engine.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
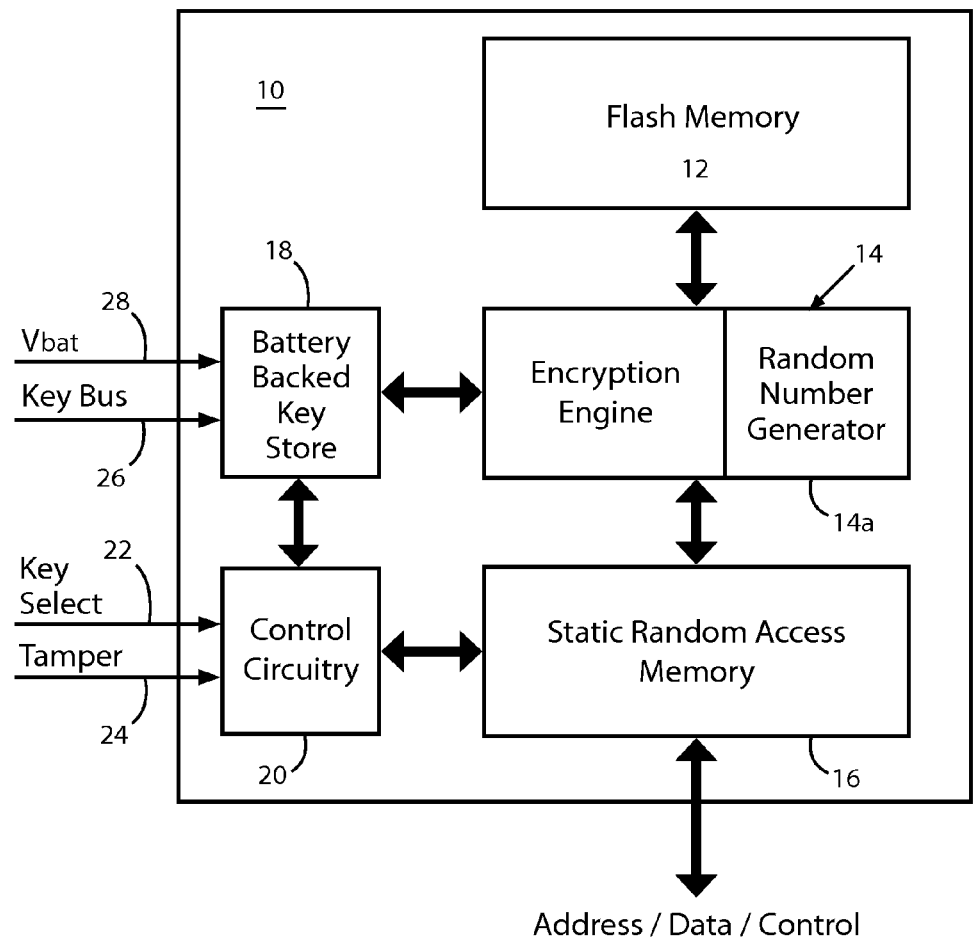
FIG. 1 is a schematic block diagram of the inventive flash memory device.

FIG. 1 shows a flash memory device 10 with an encryption capability to assure data-at-rest protection, according to the invention. The device 10 can be used in existing or future host systems that require data, when stored in a memory for access by a processor in the host system, to be encrypted while at rest. As used herein, the term "data" refers broadly to any information capable of storage in a memory for access by a processor, whether or not the information is critical or classified.

The memory device 10 includes a conventional NAND or NOR type flash memory 12, and an encryption engine 14 with input and output (I/O) ports that are coupled to corresponding ports of the memory 12. Basically, the engine 14 includes a random number generator 14a, and is configured in a known manner to encrypt data originating from a host system processor and to write the encrypted data to the memory 12, and to decrypt data stored in the memory 12 when called by the host system processor. The engine 14 preferably implements the 256 bit Advanced Encryption Standard (AES), details of which can be obtained from Federal Information Processing Standards (FIPS) Publication 197 (November 2001), and NIST Special Publications 800-90A (January 2012) and 800-38A (2001), all relevant contents of which are incorporated by reference. The engine 14 may also be configured to implement other known encryption keys if desired or required for information that will be stored in the memory 12.

The memory device 10 also includes a static random access memory (SRAM) 16 to interface with the host system. Because the host system processor reads from and writes to the SRAM 16, the device 10 responds faster than a typical flash memory with respect to read/write operations. In addition, the device 10 includes a battery backed key store 18 that is coupled to the encryption engine 14, and control circuitry 20 coupled to the key store 18 and to the SRAM 16 as shown in FIG. 1. Terminals or pins associated with the key store 18 and the control circuitry 20 are described below. Further details of the key store 18 and the control circuitry 20 would be apparent to those skilled in the art.

Key Select 22—A terminal or pin 22 of the control circuitry 20 is provided to control the key store 18 so that the store will accept either a user supplied encryption key, or a self-generated encryption key. For example, if the pin 22 is set high, the encryption key is provided by the user. If pin 22 is low, the key is generated via the random number generator 14a. A user makes this determination based on his or her concept of operations. A user supplied key will allow encrypted data residing in the flash memory 12 to be recovered after a tamper attempt signal is input to the control circuitry 20 on a pin 24 (see below). A user supplied key will require the user to manage and be responsible for distribution of the key among authorized personnel, however. An internally generated key will not require the user to manage the key distribution, but any data residing on the flash memory 12 will not be recoverable once a tamper attempt signal is input to the circuitry 20. In either case, a new key, whether user supplied or self-generated, will allow the flash memory 12 to be reprogrammed with encrypted data as long as a tamper event is not signaled.

Key Bus 26—This is a serial bus for inputting a user supplied encryption key to the key store 18. For example, if the key select pin 22 is set high, the bus 26 is active and the user supplied key is entered via the bus 26 into the key store 18. If the key select pin 22 is set low, however, the bus 26 is disabled. Under no circumstances can an encryption key ever be read out from the device 10 via the bus 26 or otherwise.

Tamper 24—When a tamper attempt signal is input to the control circuitry 20 on the pin 24, and if main power is present when the signal is detected; the control circuitry 20 is configured to erase all information stored in the SRAM 16 and any key held in the key store 18. If main power is not present when a tamper attempt is signaled, the circuitry 20 will only operate to erase the key (if any) then held by the key store 18, since the SRAM will not contain any data.

Vbat 28—If voltage from a back up battery is applied on pin 28 of the key store 18, any key held in the key store 18 is preserved in the event main power fails. Because keys are normally held in the key store when main power is present, the battery can be replaced as long as main power is present without affecting the operation or stability of the flash memory device 10. In the absence of both main power and voltage on pin 28 from the back-up battery, the key store 18 will not hold an encryption key.

Operation

Figure 2:
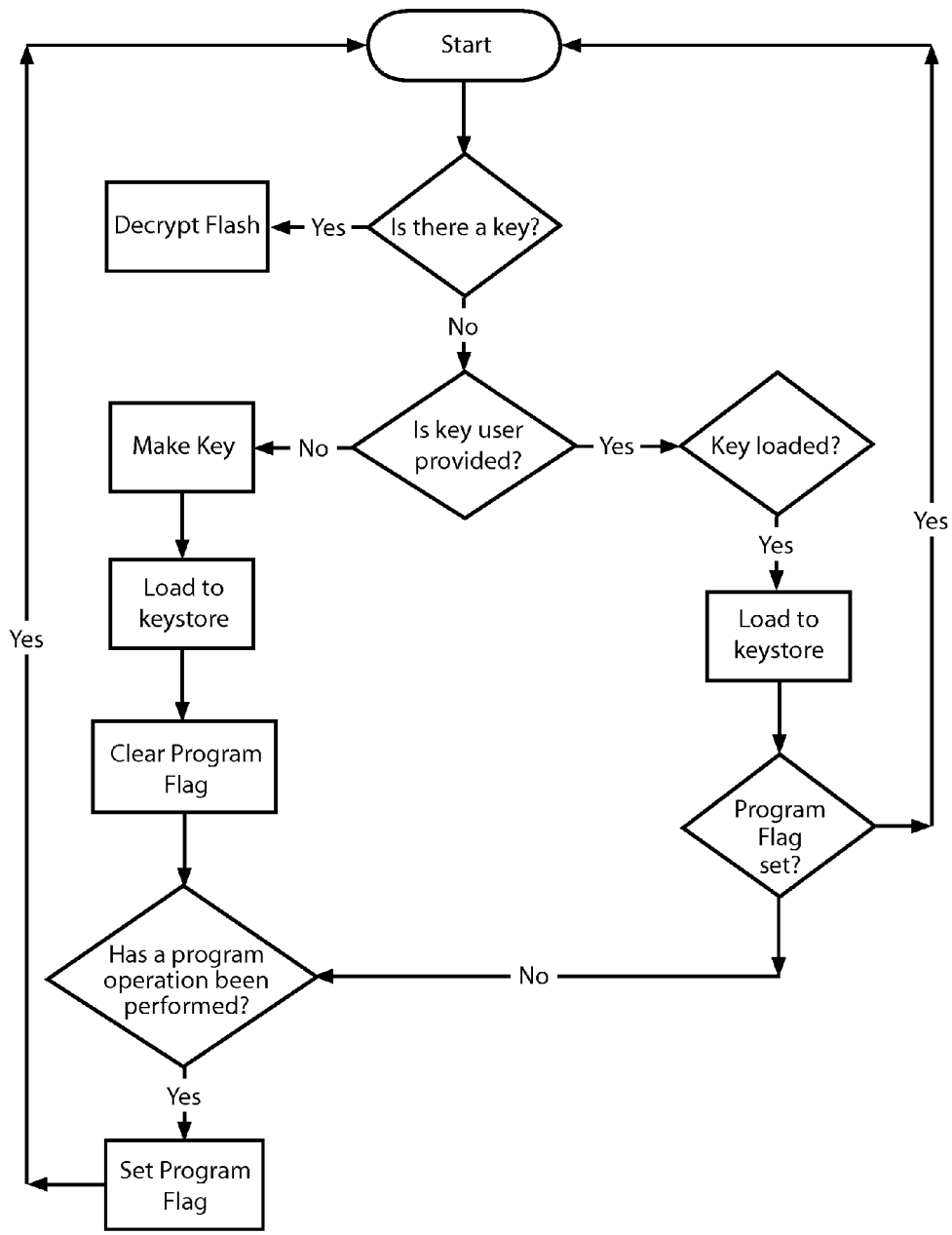
FIG. 2 is a flow diagram illustrating an operation of the memory device in FIG. 1.

As shown in the flow diagram of FIG. 2, upon power up or reset, the control circuitry 20 is configured to determine if the key store 18 contains a valid key (e.g., not all ones or all zeroes). If a valid key is found, the circuitry 20 looks for a program flag which indicates that the flash memory has been programmed with encrypted data. If the program flag is set, the circuitry 20 causes the engine 14 to decrypt the data stored in the flash memory 12 and to write the decrypted data to the SRAM 16. If the program flag is not set, the circuitry 20 waits for the program flag to be set to indicate the flash memory 12 has been programmed with data to be decrypted by the engine 14. As long as a valid key is determined, the flash memory device 10 will continue to operate.

If the control circuitry 20 determines that the key store 18 does not contain a valid key, the program flag is cleared (if previously set), and the state of the key select pin 22 is read. If the pin is, e.g., tied high, the circuitry 20 waits for a valid key to be supplied to the key store 18 by the user. Once a valid key is loaded, the circuitry is configured to respond as described above for the case where a valid key is present. Note that if a "valid" but wrong or incorrect key is loaded, for example, after a tamper attempt, the encryption engine 14 may process encrypted data from the flash memory 12, but the engine 14 will not yield intelligible or usable data when using the wrong key.

If the pin 22 is, e.g., tied low indicating that a valid key is not held in the key store 18, the circuitry 20 is configured to generate a key provided by the random number generator 14a. Once a valid key is generated, the circuitry 20 waits for the flash memory 12 to be programmed with encrypted data, and the program flag is set. The program flag is preferably non-volatile so that if power is removed and subsequently restored, the device 10 will return to the state indicated by the program flag.

Note that the control circuitry 20 is configured to operate to distinguish between programmed and unprogrammed states of the flash memory 12, by reading the program flag which can be set only after a valid key has been entered in the key store 18 whether by the user or self-generated. When powered up and with a valid key held in the store 18, any data residing in the non-volatile flash memory 12 will be decrypted if the program flag is set, and programming of the flash memory 12 will be accepted if the flag is not set.

During operation, any data originating from the host system processor to be written in the flash memory 12 will be encrypted by the engine 14 before storing the data in the memory 12. Since the data from the host system is written initially to the SRAM 16 of the memory device 10 (in operation of the device 10, all reads and writes are via the SRAM 16), the process of encrypting and writing the additional data to the flash memory 12 does not affect the access time.

It will be appreciated that the inventive flash memory device 10 operates like a standard flash device from a system perspective. Therefore, typical address, data, and control signals (see bottom of FIG. 1) to and from the host system are not described here in detail. And because the host system processor actually reads from and writes to the SRAM 16, the memory device 10 responds faster than typical flash memories to read/write operations.

The memory device 10 can operate in any host system where battery backup and tamper indication are available. It can also operate keyless (generate its own key), or with a user supplied key. In either case, the key cannot be read externally. Importantly, the device 10 obviates the need for a separate encryption step and ensures that data stored in the flash memory 12 will always be encrypted at rest without any intervention from the host system in which it is embedded. No external hardware or software is needed to accomplish the encryption function.

While certain embodiments of the present invention are described and illustrated herein, it will be understood by persons skilled in the art that various modifications, additions, and changes can be made without departing from the spirit and scope of the invention. Accordingly, the invention encompasses all such modifications, additions, and changes that lie within the bounds of the following claims.

The invention claimed is:

1. A method of encrypting and decrypting data for non-volatile storage in a memory device, wherein at least one processor in a host system is programmed to write the data to the memory device and to read the data from the memory device, comprising:
   providing a flash memory section,
   encrypting the data originating from the host system via an encryption engine coupled to the flash memory section and writing the encrypted data to the flash memory section, and for decrypting data stored in the flash memory section for access by the host system,
   supplying the data from the host system to the encryption engine via a static random access memory (SRAM) coupled to the encryption engine, and for receiving the decrypted data from the encryption engine for access by the host system,
   holding encryption keys supplied by either a user or the encryption engine in a key store, and
   controlling operation of the memory device via control circuitry;
   determining if a valid encryption key is held in the key store;
   if a valid key is held in the key store, then determining if a program flag is set to indicate that any encrypted data stored in the flash memory is ready to be decrypted;
   if the program flag is set, transitioning to a first state including writing and reading data to and from the flash memory section; and
   if the program flag is not set, transitioning to a second state including waiting for the program flag to be set,
   wherein the flash memory section, the encryption engine, the key store, the SRAM and the control circuitry reside within the memory device.

2. The method of claim 1, wherein the first state includes accepting data provided to the memory device by the host system by storing the data in the SRAM for use by the encryption engine, encrypting the data, and storing the encrypted data in the flash memory section.

3. The method of claim 1, including configuring the key store so that if a valid encryption key is not held in store, either (a) transitioning to a third state including creating an encryption key and transitioning to the second state or (b) transitioning to a fourth state including waiting for a valid key to be entered by a user, according to the state of a key select input to the control circuitry.

4. The method of claim 1, further comprising communicating between the encryption engine and the flash memory section without special busses or drivers.

5. The method of claim 1, further comprising creating encryption keys from a random number generator associated with the encryption engine.

6. The method of claim 1, further comprising determining by the user whether the encryption keys are supplied by the user or by the encryption engine.

7. The method of claim 1, further comprising allowing operations of the memory device in response to input signals corresponding to at least one of a key select and a tamper attempt.

8. The method of claim 1, including storing the encryption key, whether created by the encryption engine or entered by a user, in a volatile key store memory region of the key store, and isolating the key store memory region from operating regions of the SRAM and the flash memory section.

9. The method of claim 8, including powering the memory device, including the key store memory region, from either a main power supply or a backup battery.

10. A memory device for storing data, comprising:
    a flash memory;
    an encryption engine coupled to the flash memory for encrypting data originating from at least one processor of a host system and storing the encrypted data in the flash memory, and for decrypting encrypted data stored in the flash memory;
    a random number generator associated with the encryption engine and arranged for creating encryption keys;
    a key store coupled to the encryption engine for holding an encryption key that is either created by the encryption engine or entered in the key store by a user;
    a static random access memory (SRAM) coupled to the encryption engine for supplying the data originating from the host system to the encryption engine, and for receiving and storing the decrypted data from the encryption engine for access by the host system; and
    control circuitry coupled to the key store and the SRAM, wherein the circuitry is configured for allowing operations of the memory device in response to input signals corresponding to at least one of a key select and a tamper attempt, and for setting a program flag when encrypted data in the flash memory is ready for decryption by the encryption engine, and when the flash memory is ready to be programmed with encrypted data from the encryption engine,
    wherein the flash memory, the encryption engine, the random number generator, the key store, the SRAM and the control circuitry reside within the memory device.

11. The memory device according to claim 10, wherein the encryption engine and the flash memory communicate without special busses or drivers.

12. The memory device according to claim 10, wherein the device replaces existing system memory with encrypted memory.

13. The memory device according to claim 10, wherein the key store includes a volatile key store memory region that is securely isolated from operating regions of the SRAM and the flash memory.

14. The memory device according to claim 13, including a main power supply and a backup battery for powering the key store memory region.

15. The memory device according to claim 13, wherein the control circuitry is operative to (a) determine if a valid encryption key is held in the key store, (b) if a valid key is held in the key store, then determine if the program flag is set, (c) if the program flag is set, transition to a first state including writing and reading data to and from the flash memory in response to the operation of the host system, and (d) if the program flag is not set, transition to a second state including waiting for the program flag to be set.

16. The memory device according to claim 15, wherein the control circuitry is configured so that when in the first state, the device (a) accepts data provided to the device by the host system by storing the data in the SRAM for use by the encryption engine, (b) encrypts the data, and (c) stores the encrypted data in the flash memory.

17. The memory device according to claim 15, wherein the control circuitry is configured so that if a valid encryption key is not held in the key store, the device either (a) transitions to a third state in which the encryption engine creates a key and the device then transitions to the second state or (b) transitions to a fourth state wherein the device waits for a valid key to be entered by a user, according to a key select signal that is input to the control circuitry.

* * * * *